US 12,472,195 B2

(12) United States Patent
Zhou et al.

(10) Patent No.: US 12,472,195 B2
(45) Date of Patent: Nov. 18, 2025

(54) INHALATION FORMULATIONS OF ANTIMICROBIAL COMPOUNDS

(71) Applicants: Purdue Research Foundation, West Lafayette, IN (US); Monash University, Clayton (AU)

(72) Inventors: Qi Zhou, West Lafayette, IN (US); Maizbha Uddin Ahmed, West Lafayette, IN (US); Jian Li, Carnegie (AU); Mohammad Abul Kalam Azad, Melton South (AU)

(73) Assignees: Purdue Research Foundation, West Lafayette, IN (US); Monash University, Clayton (AU)

( * ) Notice: Subject to any disclaimer, the term of this patent is extended or adjusted under 35 U.S.C. 154(b) by 463 days.

(21) Appl. No.: 18/011,155

(22) PCT Filed: May 3, 2021

(86) PCT No.: PCT/US2021/030393
§ 371 (c)(1),
(2) Date: Dec. 16, 2022

(87) PCT Pub. No.: WO2022/005593
PCT Pub. Date: Jan. 6, 2022

(65) Prior Publication Data
US 2023/0233590 A1    Jul. 27, 2023

Related U.S. Application Data

(60) Provisional application No. 63/047,280, filed on Jul. 2, 2020.

(51) Int. Cl.
| | | |
|---|---|---|
| A61K 31/7036 | (2006.01) |
| A61K 9/00 | (2006.01) |
| A61K 9/16 | (2006.01) |
| A61K 38/12 | (2006.01) |
| A61P 11/00 | (2006.01) |
| A61P 31/04 | (2006.01) |

(52) U.S. Cl.
CPC ........ *A61K 31/7036* (2013.01); *A61K 9/0075* (2013.01); *A61K 9/0078* (2013.01); *A61K 9/1682* (2013.01); *A61K 38/12* (2013.01); *A61P 11/00* (2018.01); *A61P 31/04* (2018.01)

(58) Field of Classification Search
CPC ........................... A61K 31/7036; A61P 31/04
See application file for complete search history.

(56) References Cited

U.S. PATENT DOCUMENTS

| | | |
|---|---|---|
| 2008/0089927 A1 | 4/2008 | Malinin |
| 2010/0203139 A1 | 8/2010 | Baker, Jr. et al. |
| 2016/0222061 A1 | 8/2016 | Brown et al. |
| 2017/0368190 A1 | 12/2017 | Castillo et al. |

OTHER PUBLICATIONS

International Search Report and Written Opinion, issued by the ISA/US, Commissioner for Patents, for International Application No. PCT/US2021/030393, Aug. 5, 2021.
"Chinese Application Serial No. 202180047199.1, Response filed Jun. 3, 2025 to Office Action mailed Dec. 4, 2024", w English claims, 11 pgs.
"Chinese Application Serial No. 202180047199.1, Office Action mailed Jun. 18, 2025", w English translation, 11 pgs.
"European Application Serial No. 202180047199.1, Response to Examiner Telephone Interview filed Sep. 24, 2025", w English claims, 9 pgs.
"Chinese Application Serial No. 202180047199.1, Response filed Aug. 6, 2025 to Office Action mailed Jun. 18, 2025", w English claims, 12 pgs.

*Primary Examiner* — Amber D Steele
(74) *Attorney, Agent, or Firm* — Schwegman Lundberg & Woessner, P.A.

(57) ABSTRACT

The present disclosure generally relates to a method for reducing the toxicity of inhaled polymyxins as a therapeutic agent comprising the step of co-administration of an aminoglycoside; a method for improving the aerosolization of an aminoglycoside comprising the step of combination formulation with a polymyxin; and a process for manufacturing a dry powder composition comprising a polymyxin and aminoglycoside. Pharmaceutical compositions and methods of treatment for lung infections are within the scope of this invention.

17 Claims, 15 Drawing Sheets

FIG. 6C

INHALATION FORMULATIONS OF ANTIMICROBIAL COMPOUNDS

CROSS REFERENCE TO RELATED APPLICATIONS

The present U.S. patent application is a national stage entry under 35 U.S.C. § 371(b) of International Application No. PCT/US2021/030393, filed on May 3, 2021, which relates to and claims the priority benefit of U.S. Provisional Application No. 63/047,280, filed Jul. 2, 2020, the content of which is hereby incorporated by reference in its entirety.

GOVERNMENT SUPPORT CLAUSE

This invention was made with government support under AI132681 awarded by the National Institutes of Health. The government has certain rights in the invention.

TECHNICAL FIELD

The present application generally relates to a method for reducing the toxicity of polymyxins as a therapeutic agent comprising the step of co-administration of an aminoglycoside with polymyxins by inhalation with improved antibacterial spectra; a method for improving the aerosolization of an aminoglycoside comprising the step of combination formulation of an aminoglycoside with polymyxins; and a process for manufacturing a dry powder composition or solution comprising polymyxins and aminoglycosides. Pharmaceutical compositions and methods of treatment for lung infections are within the scope of this invention.

BACKGROUND

This section introduces aspects that may help facilitate a better understanding of the disclosure. Accordingly, these statements are to be read in this light and are not to be understood as admissions about what is or is not prior art.

The efficacy of polymyxin B and colistin against gram-negative pulmonary infections is often limited due to the poor disposition in the lungs after intravenous administration and their binding to lung surfactant. Inhalation of polymyxins is empirical and a last-line therapeutic option, especially for the treatment of pulmonary infections caused by multidrug-resistant gram-negative bacteria, mainly *Pseudomonas aeruginosa, Acinetobacter baumannii* and *Klebsiella pneumoniae* (1). Often a high and not optimized polymyxin dose is given that may lead to potential pulmonary toxicity such as pulmonary eosinophilia, acute respiratory distress syndrome, and hypersensitivity pneumonitis (1). Polymyxins cause concentration- and time-dependent toxicity in lung epithelial cells and activate multiple pathways of apoptosis (2). Polymyxins also accumulate in mitochondria of lung epithelial cells and cause mitochondrial toxicity, such as mitochondrial fragmentation, oxidative stress and membrane depolarization (3). There is an urgency of attenuation of polymyxin-induced pulmonary toxicity, which may widen the therapeutic window and allow the administration of larger doses of polymyxins safely to minimize the development of antimicrobial resistance.

Tobramycin is an aminoglycoside with significant in vitro antibacterial activity against Gram-negative bacteria (e.g. *P. aeruginosa*, Enterobacterales, *Haemophilus influenzae*) and Gram-positive bacteria (e.g. *Staphylococcus aureus*) (4). The mechanism of tobramycin-induced bacterial killing is mainly by inhibiting bacterial protein synthesis at low-intermediate concentrations (<4 mg/L) and can cause outer membrane disruption at higher concentrations (≥8 mg/L) (5). Several studies investigated sequential tobramycin and colistin therapy and the combination of both agents to treat *P. aeruginosa* associated biofilm in cystic fibrosis patients and indicated that combination therapy is superior in bacterial killing compare to any monotherapy (6, 7). Megalin-mediated endocytosis is a key mechanism in the cellular uptake of tobramycin in renal kidney tubular cells (8). Furthermore, it is reported that megalin is involved in the renal cortical accumulation of both aminoglycosides and polymyxins in vivo (8, 9).

There are unmet needs in treating various infection diseases and better uses of inhalation of polymyxins (including polymyxin-like peptides) and aminoglycosides in clinic. In addition to their antibacterial effect, a recent study demonstrated that colistin (i.e. polymyxin E) and tobramycin alone showed anti-inflammatory effects using in vitro models of NuLi-1 (healthy) and CuFi-1 (CF) cell lines (10).

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIGS. 6A-6C: FPF (FIG. 6A), E-FPF (FIG. 6B) and NGI deposition profiles (FIG. 6C) of the freshly spray dried formulations of tobramycin, polymyxin B and their combination (mean±SD, n=3 or 4). *indicates significant difference compared to SD_Col, p<0.05 and #indicates significant difference compared to SD_Tob, p<0.05.

Figure 8A:
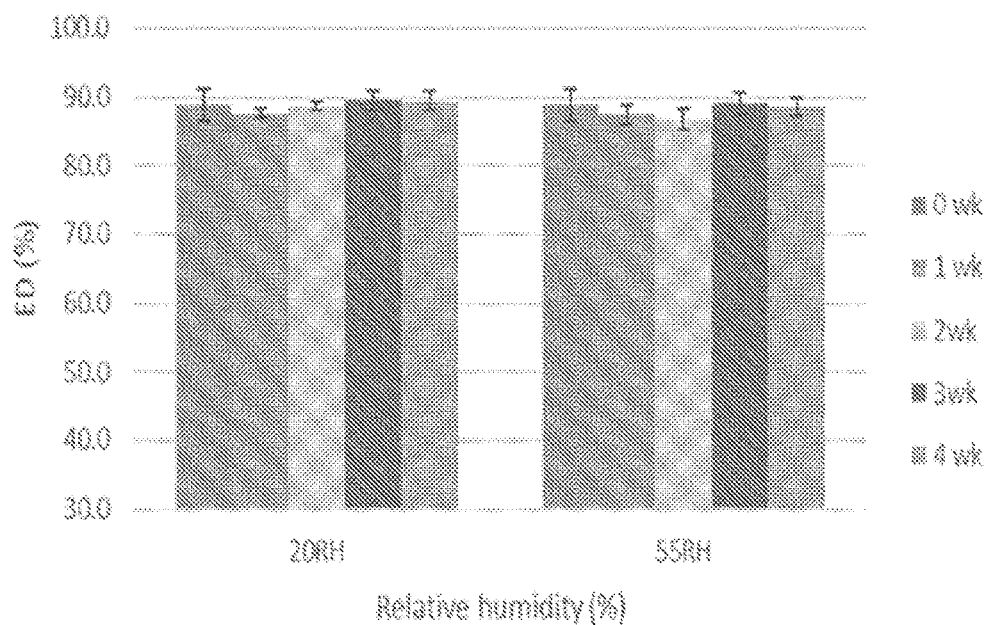
FIGS. 8A-8D: Change in ED of colistin and tobramycin in the spray dried formulations which were stored at 20%
Figure 8B:
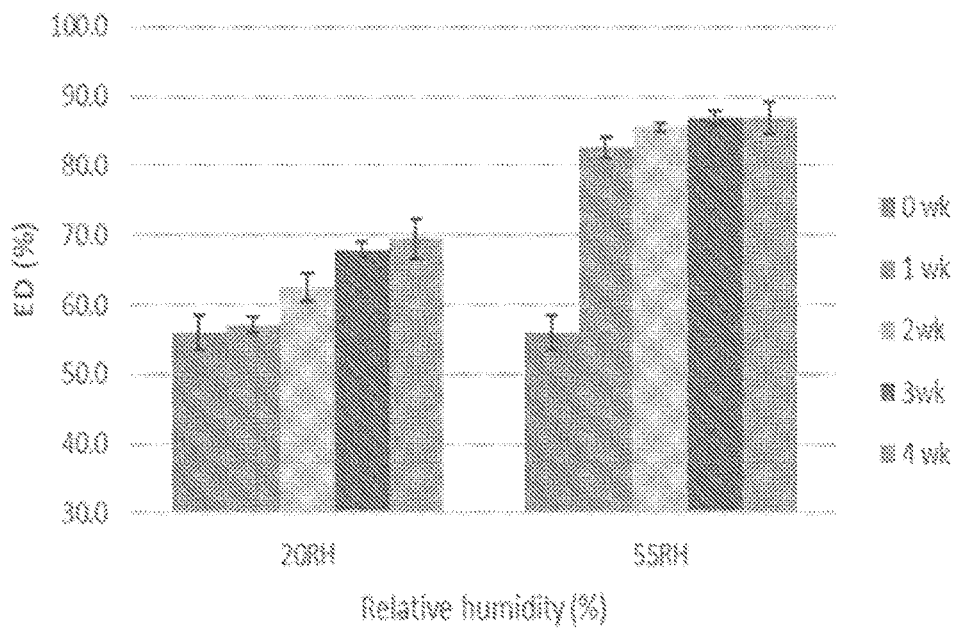
Figure 8C:
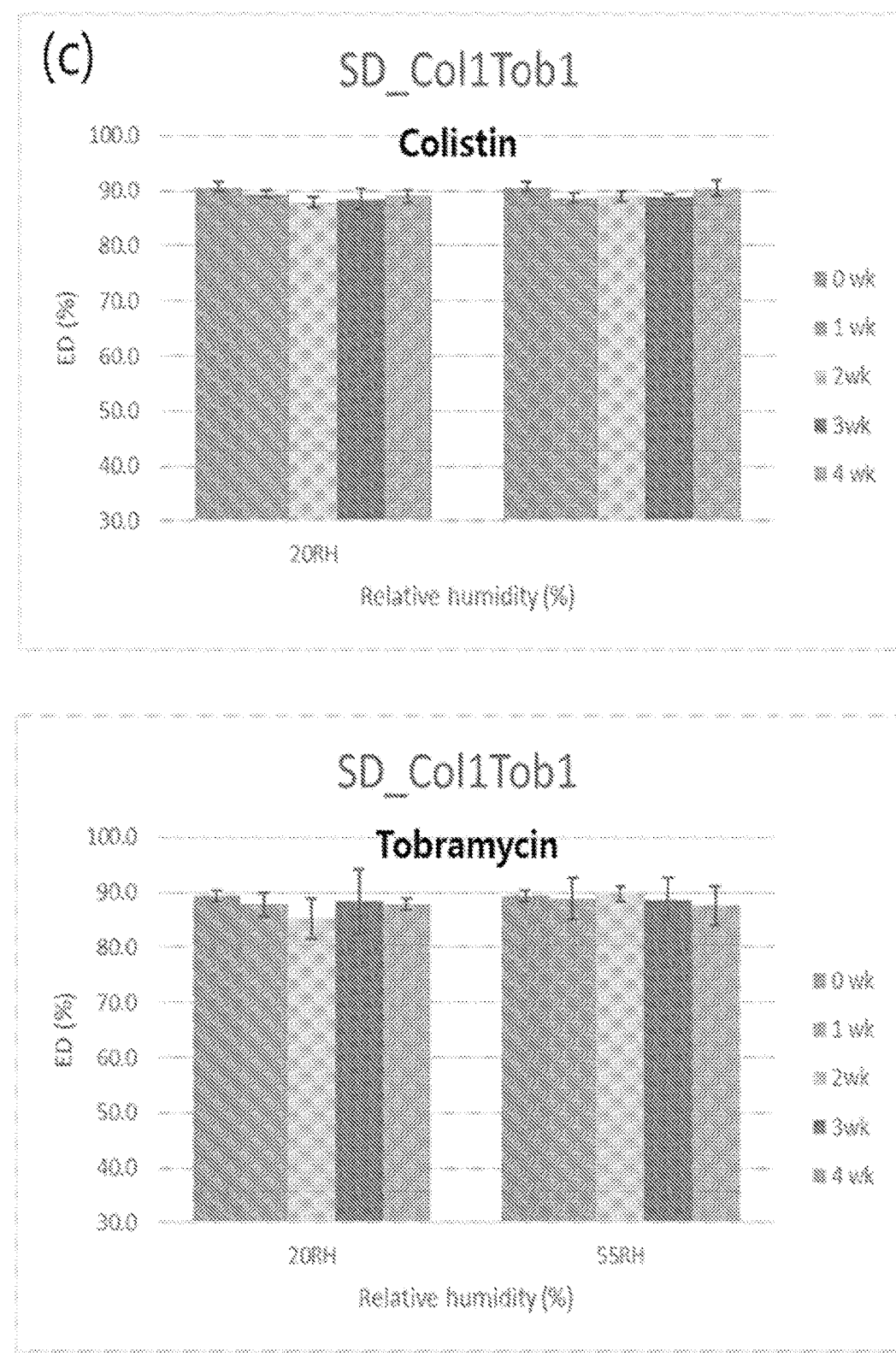
Figure 8D:
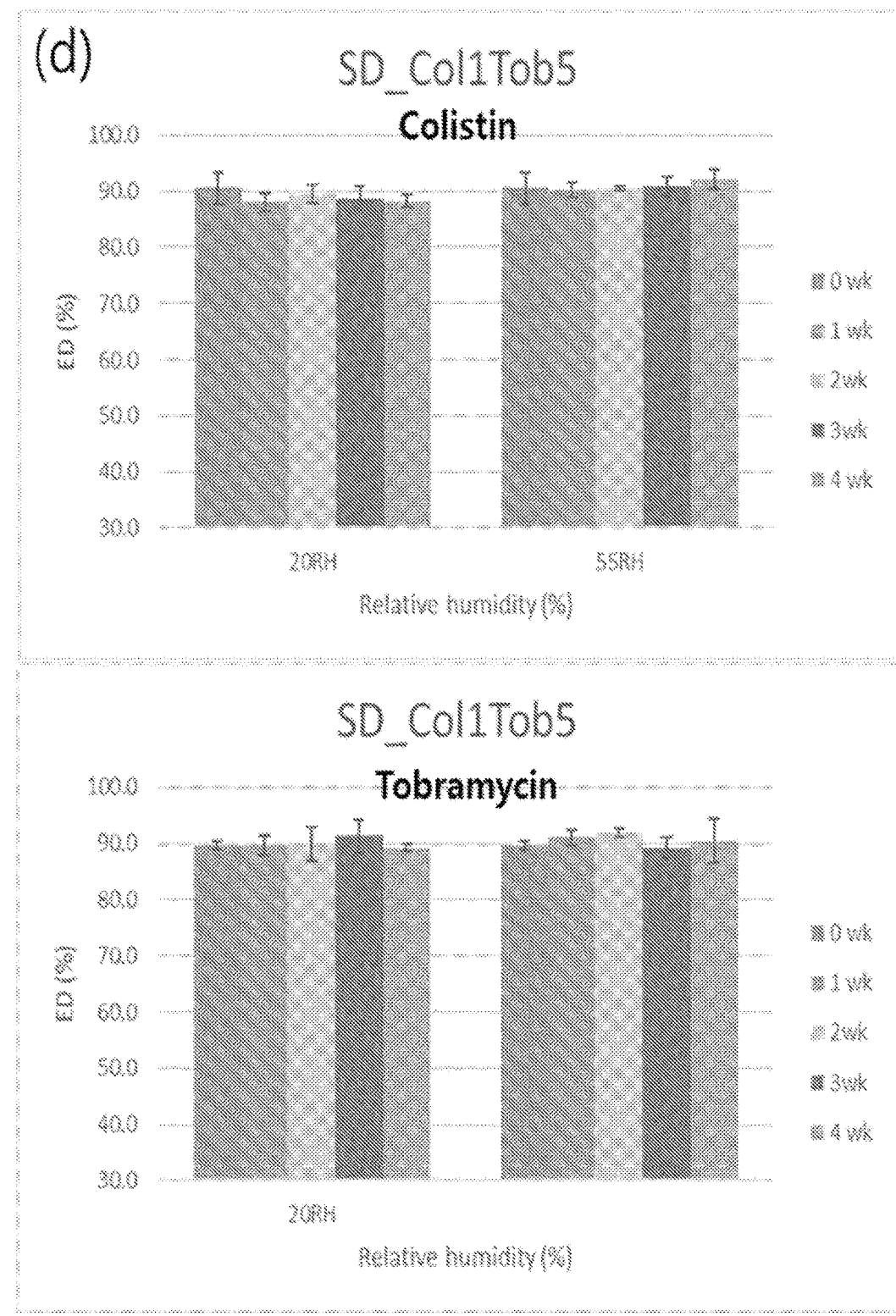

RH and 55% RH (mean±SD, n=3): SD_Col (FIG. 8A), SD_Tob (FIG. 8B), SD_Col1Tob1 (FIG. 8C), and SD_Col1Tob5 (FIG. 8D).

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

As used herein, the following terms and phrases shall have the meanings set forth below. Unless defined otherwise, all technical and scientific terms used herein have the same meaning as commonly understood to one of ordinary skill in the art.

In the present disclosure the term "about" can allow for a degree of variability in a value or range, for example, within 20%, within 10%, within 5%, or within 1% of a stated value or of a stated limit of a range.

In the present disclosure the term "substantially" can allow for a degree of variability in a value or range, for example, within 80%, within 90%, within 95%, or within 99% of a stated value or of a stated limit of a range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

As used herein, the term "salts" and "pharmaceutically acceptable salts" refer to derivatives of the disclosed compounds wherein the parent compound is modified by making acid or base salts thereof. Examples of pharmaceutically acceptable salts include, but are not limited to, mineral or organic acid salts of basic groups such as amines; and alkali or organic salts of acidic groups such as carboxylic acids. Pharmaceutically acceptable salts include the conventional non-toxic salts or the quaternary ammonium salts of the parent compound formed, for example, from non-toxic inorganic or organic acids. For example, such conventional non-toxic salts include those derived from inorganic acids such as hydrochloric, hydrobromic, sulfuric, sulfamic, phosphoric, and nitric; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, and isethionic, and the like.

Pharmaceutically acceptable salts can be synthesized from the parent compound which contains a basic or acidic moiety by conventional chemical methods. In some instances, such salts can be prepared by reacting the free acid or base forms of these compounds with a stoichiometric amount of the appropriate base or acid in water or in an organic solvent, or in a mixture of the two; generally, nonaqueous media like ether, ethyl acetate, ethanol, isopropanol, or acetonitrile are preferred. Lists of suitable salts are found in Remington's Pharmaceutical Sciences, 18th ed., Mack Publishing Company, Easton, Pa., 1990, the disclosure of which is hereby incorporated by reference.

The term "solvate" means a compound, or a salt thereof, that further includes a stoichiometric or non-stoichiometric amount of solvent bound by non-covalent intermolecular forces. Where the solvent is water, the solvate is a hydrate.

The term "prodrug" means a derivative of a compound that can hydrolyze, oxidize, or otherwise react under biological conditions (in vitro or in vivo) to provide an active compound, particularly a compound of the invention. Examples of prodrugs include, but are not limited to, derivatives and metabolites of a compound of the invention that include methanesulfonates, biohydrolyzable moieties such as biohydrolyzable amides, biohydrolyzable esters, biohydrolyzable carbamates, biohydrolyzable carbonates, biohydrolyzable ureides, and biohydrolyzable phosphate analogues. Specific prodrugs of compounds with carboxyl functional groups are the lower alkyl esters of the carboxylic acid. The carboxylate esters are conveniently formed by esterifying any of the carboxylic acid moieties present on the molecule. Prodrugs can typically be prepared using well-known methods, such as those described by Burger's Medicinal Chemistry and Drug Discovery 6th ed. (11) and Design and Application of Prodrugs (H. Bundgaard ed., 1985, Harwood Academic Publishers GmbH).

Further, in each of the foregoing and following embodiments, it is to be understood that the formulae include and represent not only all pharmaceutically acceptable salts of the compounds, but also include any and all hydrates and/or solvates of the compound formulae or salts thereof. It is to be appreciated that certain functional groups, such as the hydroxy, amino, and like groups form complexes and/or coordination compounds with water and/or various solvents, in the various physical forms of the compounds. Accordingly, the above formulae are to be understood to include and represent those various hydrates and/or solvates. In each of the foregoing and following embodiments, it is also to be understood that the formulae include and represent each possible isomer, such as stereoisomers and geometric isomers, both individually and in any and all possible mixtures. In each of the foregoing and following embodiments, it is also to be understood that the formulae include and represent any and all crystalline forms, partially crystalline forms, and non-crystalline and/or amorphous forms of the compounds.

The term "pharmaceutically acceptable carrier" is art-recognized and refers to a pharmaceutically-acceptable material, composition or vehicle, such as a liquid or solid filler, diluent, excipient, solvent or encapsulating material, involved in carrying or transporting any subject composition or component thereof. Each carrier must be "acceptable" in the sense of being compatible with the subject composition and its components and not injurious to the patient. Some examples of materials which may serve as pharmaceutically acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10)

glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other nontoxic compatible substances employed in pharmaceutical formulations.

As used herein, the term "administering" includes all means of introducing the compounds and compositions described herein to the patient, including, but are not limited to, oral (po), intravenous (iv), intramuscular (im), subcutaneous (se), transdermal, inhalation, buccal, ocular, sublingual, vaginal, rectal, and the like. The compounds and compositions described herein may be administered in unit dosage forms and/or formulations containing conventional nontoxic pharmaceutically acceptable carriers, adjuvants, and vehicles.

Illustrative formats for oral administration include tablets, capsules, elixirs, syrups, and the like. Illustrative routes for parenteral administration include intravenous, intraarterial, intraperitoneal, epidural, intraurethral, intrasternal, intramuscular and subcutaneous, as well as any other art recognized route of parenteral administration.

Illustrative means of parenteral administration include needle (including microneedle) injectors, needle-free injectors and infusion techniques, as well as any other means of parenteral administration recognized in the art. Parenteral formulations are typically aqueous solutions which may contain excipients such as salts, carbohydrates and buffering agents (preferably at a pH in the range from about 3 to about 9), but, for some applications, they may be more suitably formulated as a sterile non-aqueous solution or as a dried form to be used in conjunction with a suitable vehicle such as sterile, pyrogen-free water. The preparation of parenteral formulations under sterile conditions, for example, by lyophilization, may readily be accomplished using standard pharmaceutical techniques well known to those skilled in the art. Parenteral administration of a compound is illustratively performed in the form of saline solutions or with the compound incorporated into liposomes. In cases where the compound in itself is not sufficiently soluble to be dissolved, a solubilizer such as ethanol can be applied.

The dosage of each compound of the claimed combinations depends on several factors, including: the administration method, the condition to be treated, the severity of the condition, whether the condition is to be treated or prevented, and the age, weight, and health of the person to be treated. Additionally, pharmacogenomic (the effect of genotype on the pharmacokinetic, pharmacodynamic or efficacy profile of a therapeutic) information about a particular patient may affect the dosage regimen used.

It is to be understood that in the methods described herein, the individual components of a co-administration, or combination can be administered by any suitable means, contemporaneously, simultaneously, sequentially, separately or in a single pharmaceutical formulation. Where the co-administered compounds or compositions are administered in separate dosage forms, the number of dosages administered per day for each compound may be the same or different. The compounds or compositions may be administered via the same or different routes of administration. The compounds or compositions may be administered according to simultaneous or alternating regimens, at the same or different times during the course of the therapy, concurrently in divided or single forms.

The term "therapeutically effective amount" as used herein, refers to that amount of active compound or pharmaceutical agent that elicits the biological or medicinal response in a tissue system, animal or human that is being sought by a researcher, veterinarian, medical doctor or other clinician, which includes alleviation of the symptoms of the disease or disorder being treated. In one aspect, the therapeutically effective amount is that which may treat or alleviate the disease or symptoms of the disease at a reasonable benefit/risk ratio applicable to any medical treatment. However, it is to be understood that the total daily usage of the compounds and compositions described herein may be decided by the attending physician within the scope of sound medical judgment. The specific therapeutically-effective dose level for any particular patient will depend upon a variety of factors, including the disorder being treated and the severity of the disorder; activity of the specific compound employed; the specific composition employed; the age, body weight, general health, gender and diet of the patient: the time of administration, route of administration, and rate of excretion of the specific compound employed; the duration of the treatment; drugs used in combination or coincidentally with the specific compound employed; and like factors well known to the researcher, veterinarian, medical doctor or other clinician of ordinary skill.

Depending upon the route of administration, a wide range of permissible dosages are contemplated herein, including doses falling in the range from about 1 µg/kg to about 1 g/kg. The dosages may be single or divided, and may administered according to a wide variety of protocols, including q.d. (once a day), b.i.d. (twice a day), t.i.d. (three times a day), or even every other day, once a week, once a month, once a quarter, and the like. In each of these cases it is understood that the therapeutically effective amounts described herein correspond to the instance of administration, or alternatively to the total daily, weekly, month, or quarterly dose, as determined by the dosing protocol.

In addition to the illustrative dosages and dosing protocols described herein, it is to be understood that an effective amount of any one or a mixture of the compounds described herein can be determined by the attending diagnostician or physician by the use of known techniques and/or by observing results obtained under analogous circumstances. In determining the effective amount or dose, a number of factors are considered by the attending diagnostician or physician, including, but not limited to the species of mammal, including human, its size, age, and general health, the specific disease or disorder involved, the degree of or involvement or the severity of the disease or disorder, the response of the individual patient, the particular compound administered, the mode of administration, the bioavailability characteristics of the preparation administered, the dose regimen selected, the use of concomitant medication, and other relevant circumstances.

The term "patient" includes human and non-human animals such as companion animals (dogs and cats and the like) and livestock animals. Livestock animals are animals raised for food production. The patient to be treated is preferably a mammal, in particular a human being.

Antibiotic combination therapy is a promising strategy to enhance antibacterial activity and minimize drug resistance for treatment of lung infections. Here we have shown that aminoglycosides (e.g. tobramycin) are compounds, which potentially can be used to reduce polymyxin-induced lung toxicity. We have also developed dry powder inhaler (DPI) combination formulations of tobramycin (as an example of aminoglycosides which has an inhalation product) and polymyxins for use in respiratory infections.

In some illustrative embodiments, this disclosure relates to a method of reducing the toxicity of a polymyxin as a therapeutic agent comprising the step of co-administration of an aminoglycoside with said polymyxin, wherein said aminoglycoside attenuates the in vitro and in vivo lung tissue damages caused by said polymyxin.

In some illustrative embodiments, this disclosure relates to a method of reducing the toxicity of a polymyxin as a therapeutic agent comprising the step of co-administration of an aminoglycoside with said polymyxin, wherein said therapeutic agent is for the treatment of a lung infection.

In some illustrative embodiments, this disclosure relates to a method of reducing the toxicity of a polymyxin as a therapeutic agent comprising the step of co-administration of an aminoglycoside with said polymyxin, wherein said therapeutic agent is delivered by inhalation.

In some illustrative embodiments, this disclosure relates to a method of reducing the toxicity of a polymyxin as a therapeutic agent comprising the step of co-administration of an aminoglycoside with said polymyxin, wherein the molar ratio of said polymyxin vs. said aminoglycoside are approximately in the range of from about 20:1 to about 1:20.

In some illustrative embodiments, this disclosure relates to a method of reducing the toxicity of a polymyxin as a therapeutic agent comprising the step of co-administration of an aminoglycoside with said polymyxin, wherein said polymyxin comprises polymyxin B, colistin, or any polymyxin-like peptides.

In some illustrative embodiments, this disclosure relates to a method of reducing the toxicity of a polymyxin as a therapeutic agent comprising the step of co-administration of an aminoglycoside with said polymyxin, wherein said aminoglycoside comprises at least tobramycin, amikacin, gentamicin, plazomicin, or a combination thereof.

In some illustrative embodiments, this disclosure relates to a method for improving the aerosolization of an aminoglycoside comprising the step of co-formulation of an aminoglycoside with a polymyxin.

In some other illustrative embodiments, this disclosure relates to a method for improving the aerosolization of an aminoglycoside comprising the step of co-formulation of an aminoglycoside with a polymyxin as disclosed herein, wherein the molar ratio of said polymyxin vs. said aminoglycoside is approximately in the range of from about 20:1 to about 1:20.

In some other illustrative embodiments, this disclosure relates to a process for manufacturing a solution or a suspension for nebulization of a polymyxin and an aminoglycoside comprising the steps by dissolving or suspending solid drug material of said polymyxin and said aminoglycoside in an aqueous or organic medium to afford said solution or suspension.

In some other illustrative embodiments, this disclosure relates to a process for manufacturing a solution or a suspension for nebulization of a polymyxin and an aminoglycoside comprising the steps by dissolving or suspending solid drug material of said polymyxin and said aminoglycoside in an aqueous or organic medium to afford said solution or suspension, wherein said solution or suspension is for inhalation.

In some other illustrative embodiments, this disclosure relates to a process for manufacturing a solution or a suspension for nebulization of a polymyxin and an aminoglycoside comprising the steps by dissolving or suspending solid drug material of said polymyxin and said aminoglycoside in an aqueous or organic medium to afford said solution or suspension, wherein said solution or suspension is for the treatment of a lung infection by inhalation.

In some other illustrative embodiments, this disclosure relates to a process for manufacturing a solution or a suspension for nebulization of a polymyxin and an aminoglycoside comprising the steps by dissolving or suspending solid drug material of said polymyxin and said aminoglycoside in an aqueous or organic medium to afford said solution or suspension, wherein the molar ratio of said polymyxin and aminoglycoside is in the range of from about 20:1 to about 1:20.

In some other illustrative embodiments, this disclosure relates to a process for manufacturing a solution or a suspension for nebulization of a polymyxin and an aminoglycoside comprising the steps by dissolving or suspending solid drug material of said polymyxin and said aminoglycoside in an aqueous or organic medium to afford said solution or suspension, wherein said solution or suspension comprises approximately 0.5 to about 200 mg of said polymyxin and aminoglycoside per milliliter at a molar ratio of approximately in the range of from about 20:1 to about 1:20.

Yet in some other illustrative embodiments, this disclosure relates to a process for manufacturing a dry powder composition of a polymyxin and an aminoglycoside comprising the steps of
  a. dissolving or suspending solid drug materials of said polymyxin and aminoglycoside separately in an aqueous or organic medium to prepare a drug solution or suspension;
  b. combining the two drug solutions to afford a mixed solution or suspension; and
  c. spray-drying or spray freeze drying or freeze drying of said mixed solution or suspension to afford said dry powder.

In some other illustrative embodiments, this disclosure relates to a process for manufacturing a dry powder composition of a polymyxin and an aminoglycoside as disclosed herein, wherein the dry powder is for inhalation.

In some other illustrative embodiments, this disclosure relates to a process for manufacturing a dry powder composition of a polymyxin and an aminoglycoside as disclosed herein, wherein the dry powder is for the treatment of a lung infection by inhalation.

In some other illustrative embodiments, this disclosure relates to a process for manufacturing a dry powder composition of a polymyxin and an aminoglycoside as disclosed herein, wherein the molar ratio of said polymyxin and aminoglycoside is in the range of from about 20:1 to about 1:20.

In some other illustrative embodiments, this disclosure relates to a process for manufacturing a dry powder composition of a polymyxin and an aminoglycoside as disclosed herein, wherein said solution comprises approximately 0.5 to 200 mg of said polymyxin/aminoglycoside per milliliter at a molar ratio of approximately in the range of from about 20:1 to about 1:20.

In some other illustrative embodiments, this disclosure relates to a dry powder composition manufactured according to the process as disclosed herein.

In some other illustrative embodiments, this disclosure relates to a dry powder composition manufactured according to the process as disclosed herein, wherein said polymyxin and aminoglycoside are at a molar ratio of approximately from about 20:1 to about 1:20.

In some other illustrative embodiments, this disclosure relates to a pharmaceutical composition comprising a product manufactured according to the process as disclosed herein, together with one or more pharmaceutically acceptable excipients.

In some other illustrative embodiments, this disclosure relates to a pharmaceutical composition comprising a product manufactured according to the process as disclosed herein, together with one or more pharmaceutically acceptable excipients, wherein said polymyxin and aminoglycoside are at a molar ratio of from about 20:1 to about 1:20.

Results and Discussion—Toxicity

Figure 1:
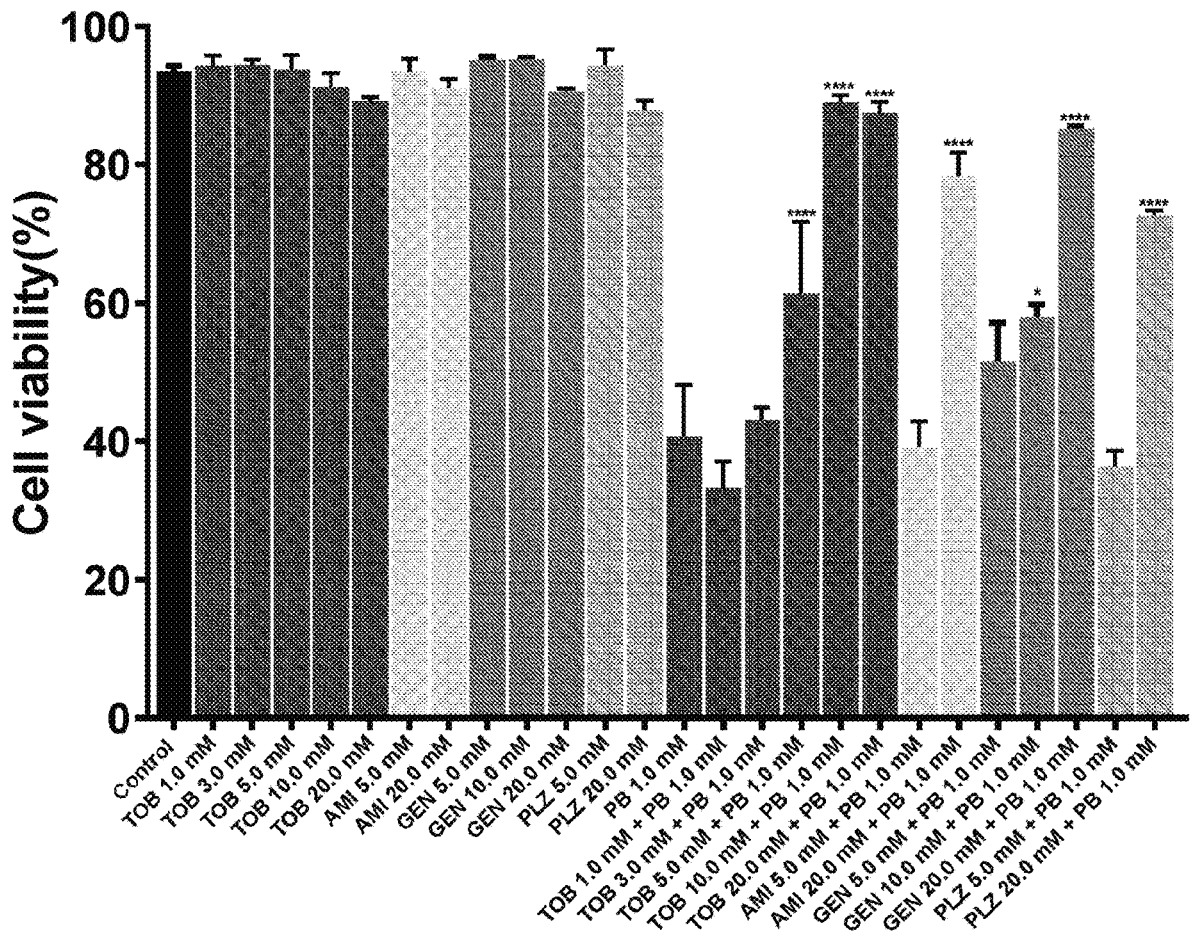
FIG. 1: Inhibition of polymyxin B (PB, as a representative of polymyxins) induced toxicity by concurrent use of aminoglycosides (tobramycin [TOB], amikacin [AMI], gentamicin [GEN] and plazomicin [PLZ]) in human lung epithelial A549 cells. Data are presented as mean±SD (n=3). Levels of statistical significance are described as asterisks, *p<0.05 and ****p<0.0001.
Figure 2:
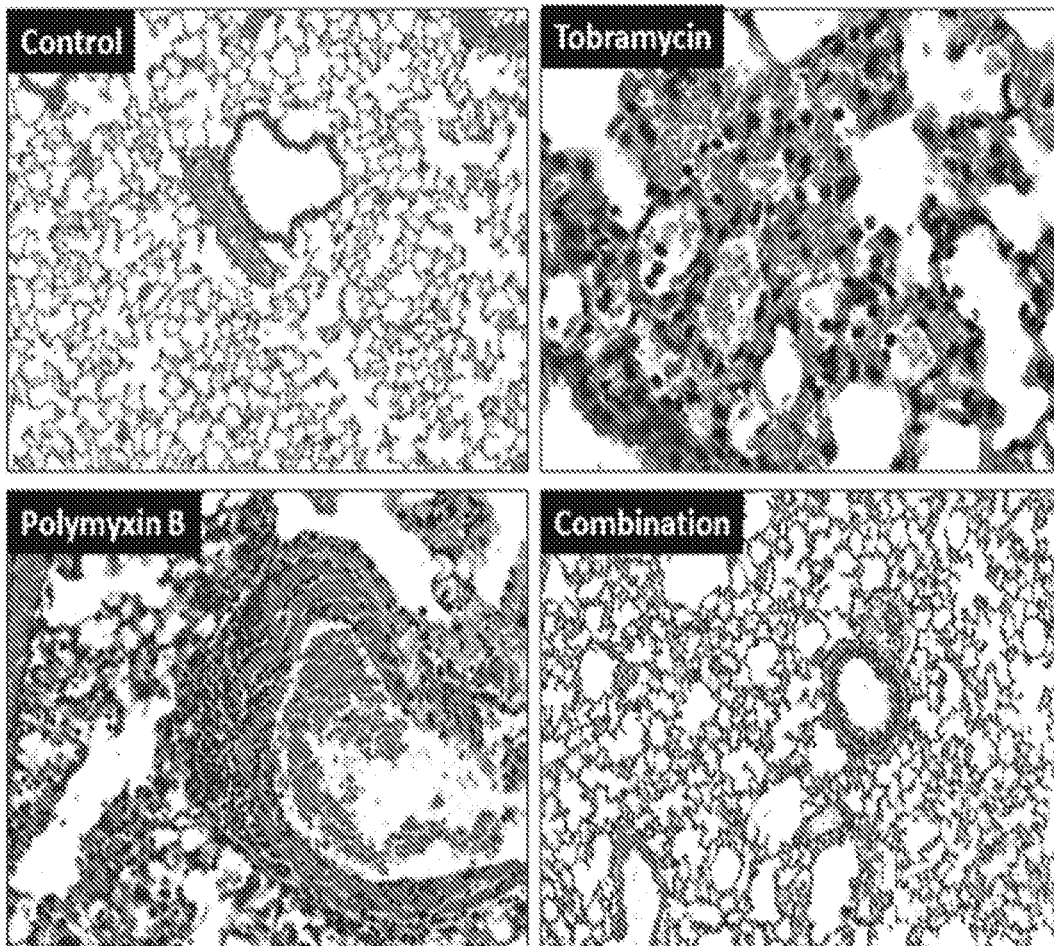
FIG. 2: Histological assessment of mouse lung tissue injuries in different treatment groups.

Tobramycin significantly inhibited polymyxin B-induced toxicity in human lung epithelial A549 cells (increase in cell viability, FIG. 1). Tobramycin (20.0 mM) significantly increased the cell viability from 40.7±7.4% by 1.0 mM polymyxin B to 87.4±1.6% (p<0.0001). Similar inhibitions of cell death were observed when amikacin, gentamicin and plazomicin were co-administered with polymyxin B (FIG. 1). Histological data in FIG. 2 confirmed that tobramycin nebulization (as an example of aminoglycosides) significantly reduced polymyxin B-induced pulmonary toxicity in mice (p<0.01). Control (0.9% saline) group showed no macroscopic and microscopic lesion (semi-quantitative score [SQS]: 0), 10 mg/kg polymyxin B showed no macroscopic lesion but severe tissue injury affecting 25-50% of the area (SQS: +2 to +5), 60 mg/kg tobramycin showed minimal to mild damage affecting <5-10% of the area with mild focal intra-alveolar haemorrhage (SQS: 0 to +1), the combination of 10 mg/kg polymyxin B and 60 mg/kg tobramycin showed minimal macroscopic and mild microscopic damage affecting 1-20% (SQS: 0 to +2) of the tissue **p<0.01 (12).

Particle Morphology and PXRD

Figure 3:
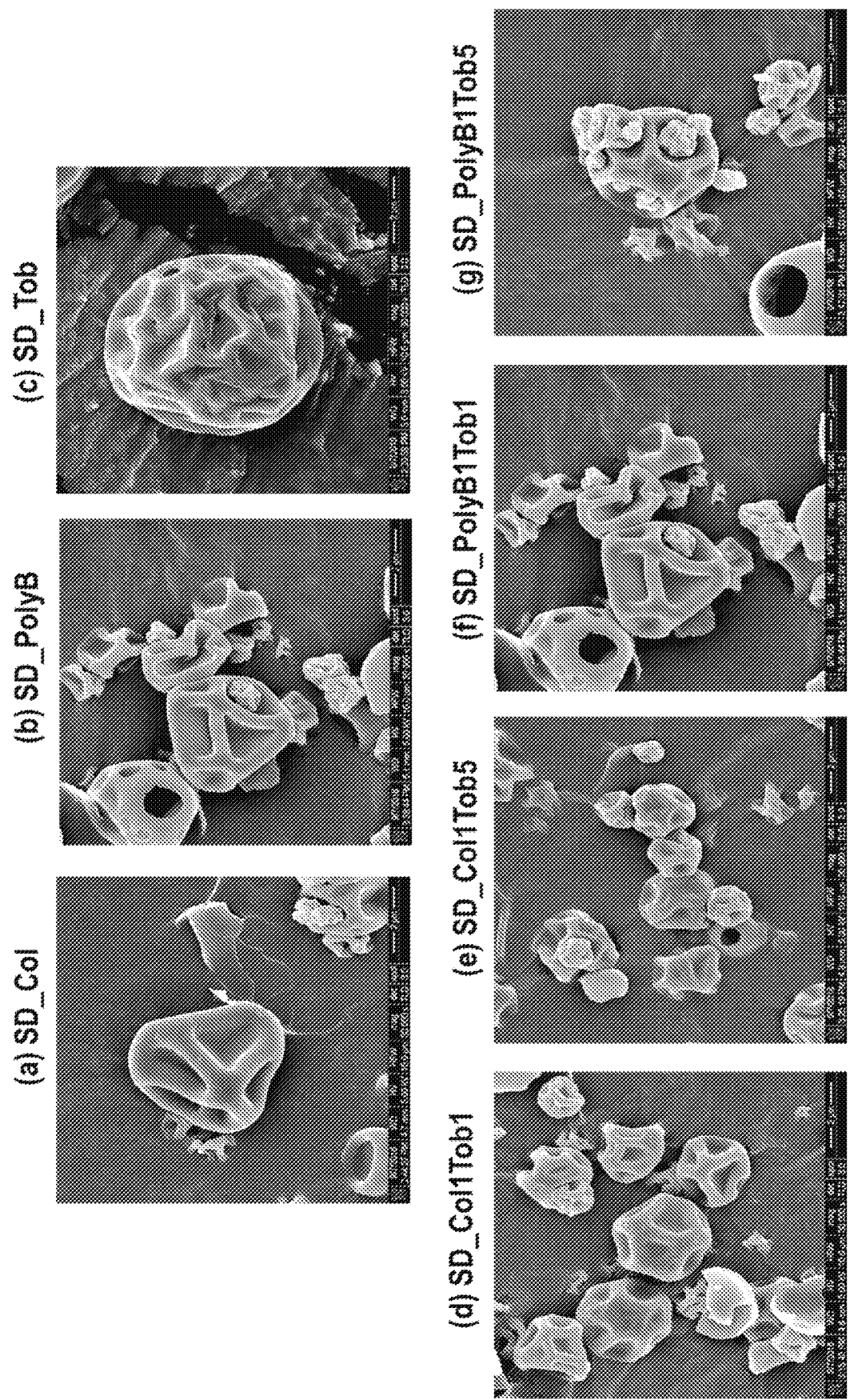
FIG. 3: Representative scanning electron microscopy (SEM) images of (a) spray dried colistin (SD_Col), (b) spray dried polymyxin B (SD_PolyB), (c) spray dried tobramycin (SD_Tob), (d) SD_Col1Tob1, (e) SD_Col1Tob5, (f) SD_PolyB1Tob1 and (g) SD_PolyB1Tob5.
Figure 4A:
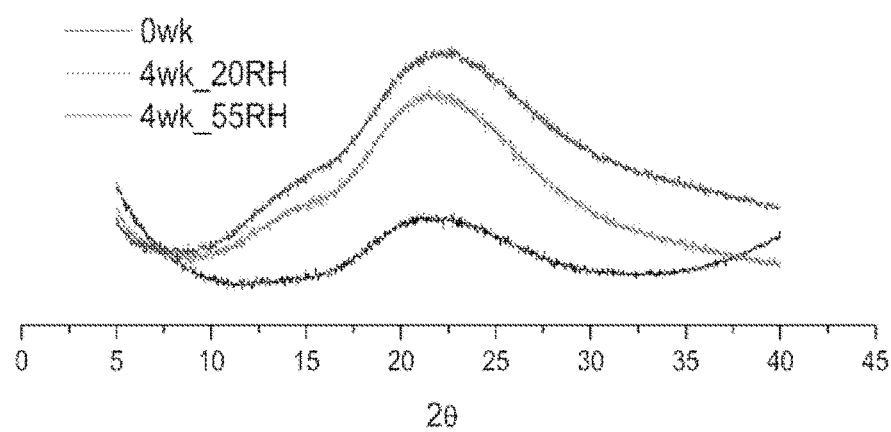
FIGS. 4A-4D: X-ray diffraction patterns of samples freshly spray-dried (0 wk) and stored at 20 (4wk_20RH) and 55% RH (4wk_55RH) for 4 weeks: SD_Col (FIG. 4A), SD_Tob (FIG. 4B), SD_Col1Tob1 (FIG. 4C), and SD_Col1Tob5 (FIG. 4D).
Figure 4B:
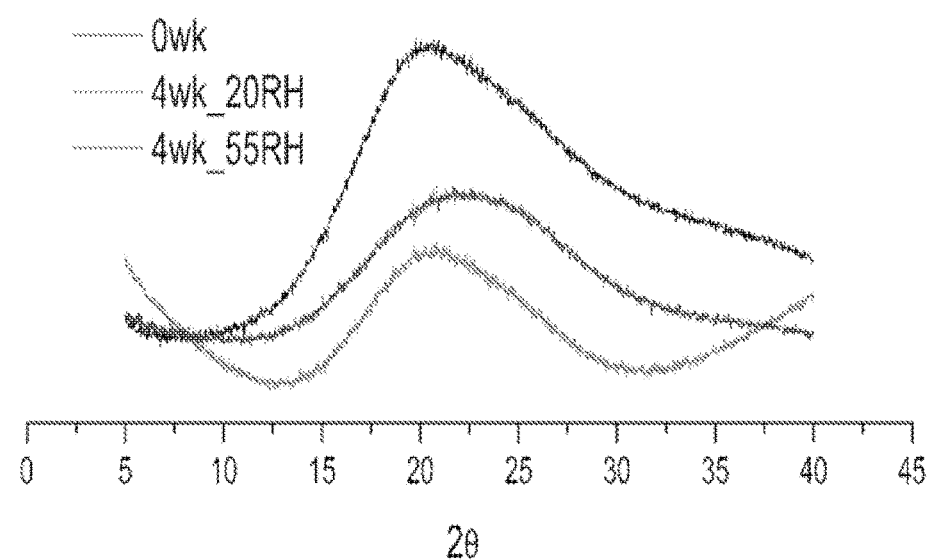
Figure 4C:
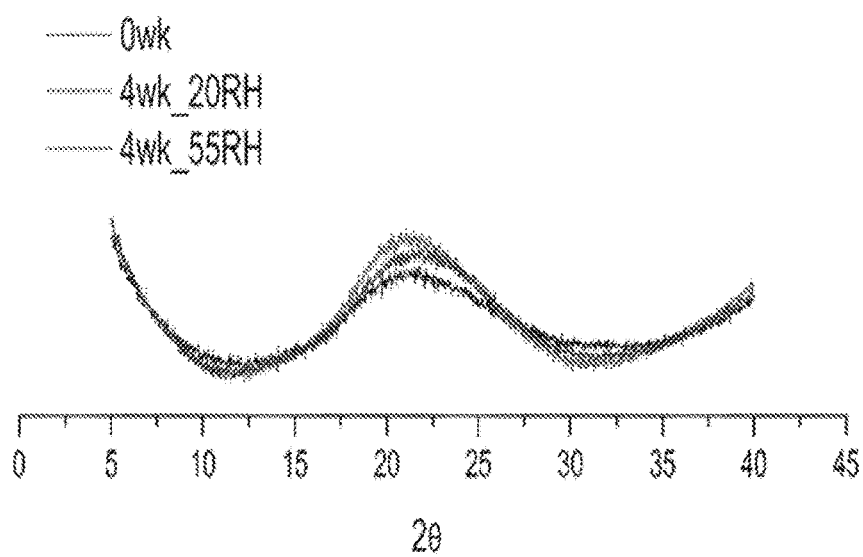
Figure 4D:
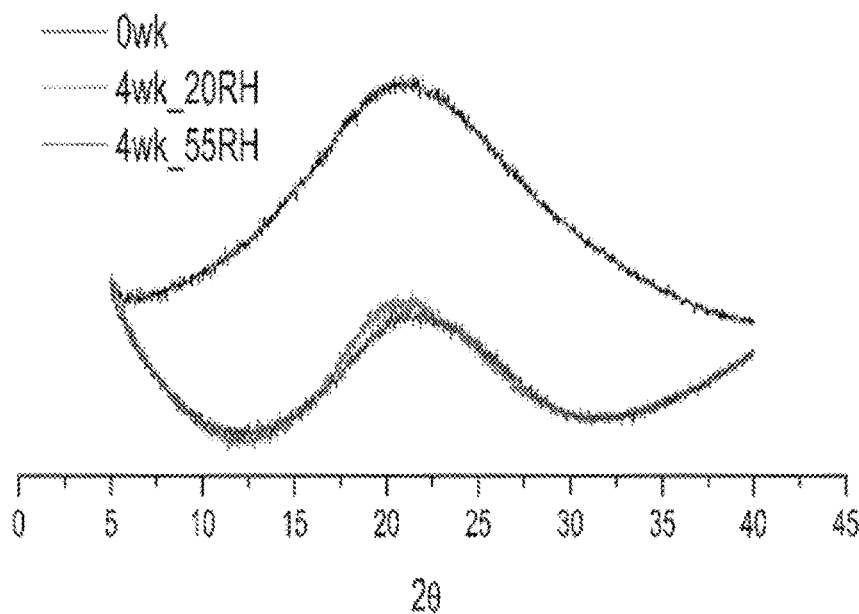

FIG. 3 shows the representative SEM images of the spray dried formulations. The SEM image of SD_Col (FIG. 3a) and SD_PolyB (FIG. 3b) in general showed spherical dimpled shapes with some showing smooth but hollow particles. SD_Tob appeared as near-spherical particles with rough surfaces (FIG. 3c). Interestingly, morphology and surface roughness of the composite formulations looks like SD_Col or SD_PolyB than SD_Tob. All composite formulations of spray dried colistin, tobramycin and their combination showed no sharp peaks in PXRD patterns indicating their amorphous nature (FIG. 4). Polymyxin B and colistin were used as examples of polymyxins and tobramycin were used as an example of aminoglycosides.

Content Uniformity and PSD

For all spray dried combination formulations, the AV value was below 15% which means that the content uniformity was acceptable based on standard criterion of USP (Table 1). In addition, all spray dried formulations had $D_{50}$ of <2.5 μm and span value of <2 (Table 2). The results show that desired dry powder formulations were prepared with uniform content and appropriate particle size distribution.

In-Vitro Aerosolization Performance

Figure 5A:
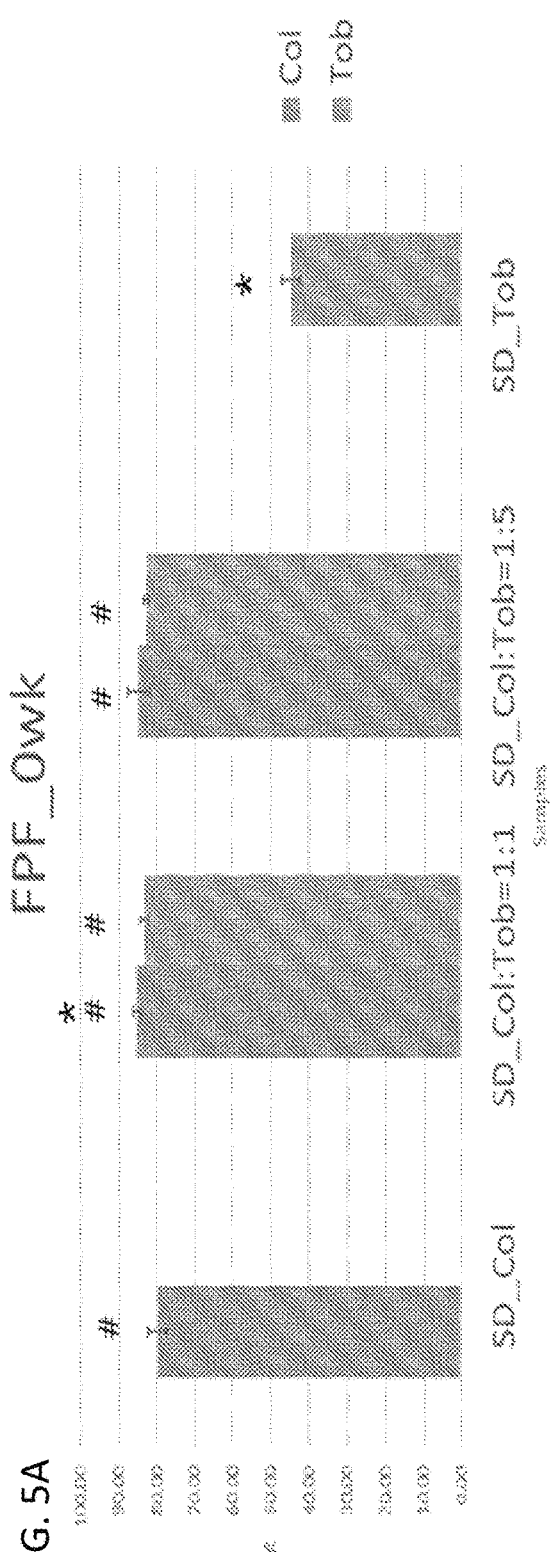
FIGS. 5A-5C: FPF (FIG. 5A), E-FPF (FIG. 5B) and NGI deposition profiles (FIG. 5C) of the freshly spray dried formulations of tobramycin, colistin and their combinations (mean±SD, n=3 or 4). * indicates significant difference compared to SD_Col, p<0.05 and * indicates significant difference compared to SD_Tob, p<0.05.
Figure 5B:
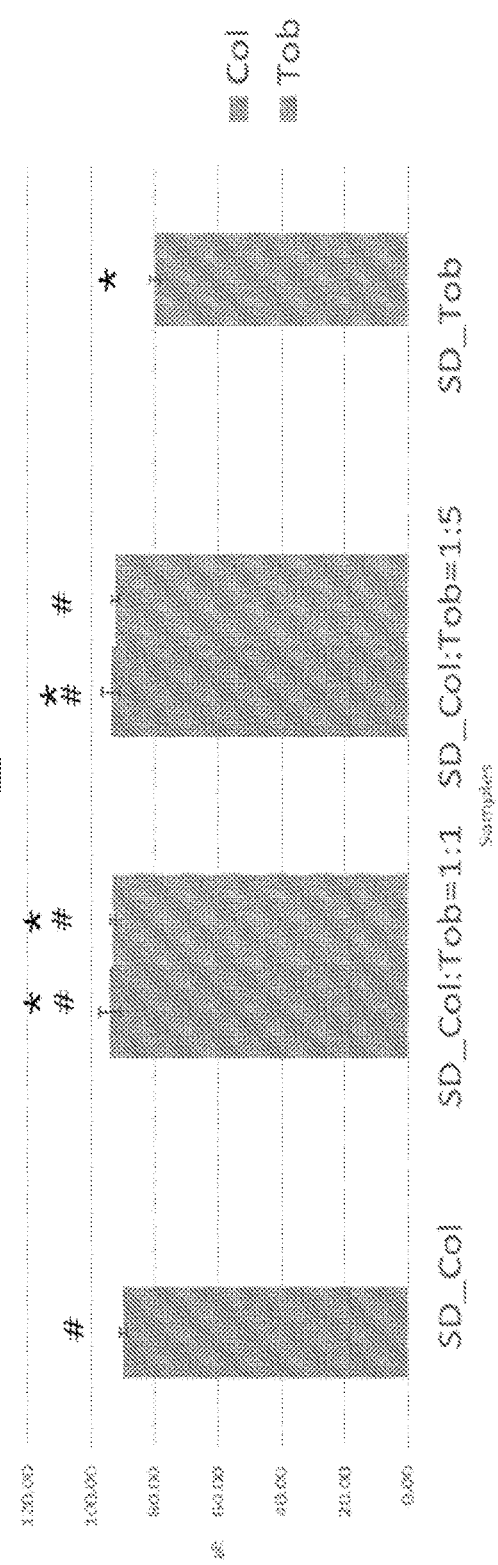
Figure 5C:
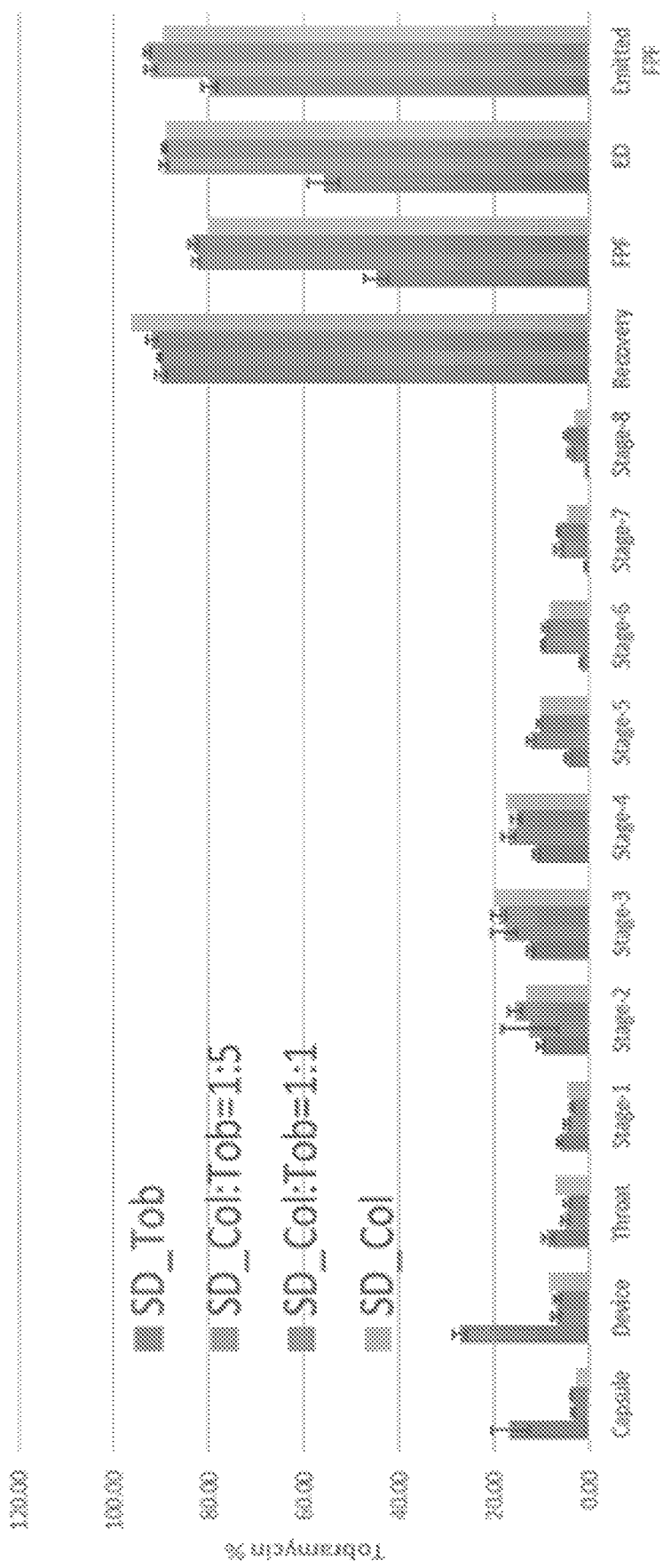
Figure 6A:
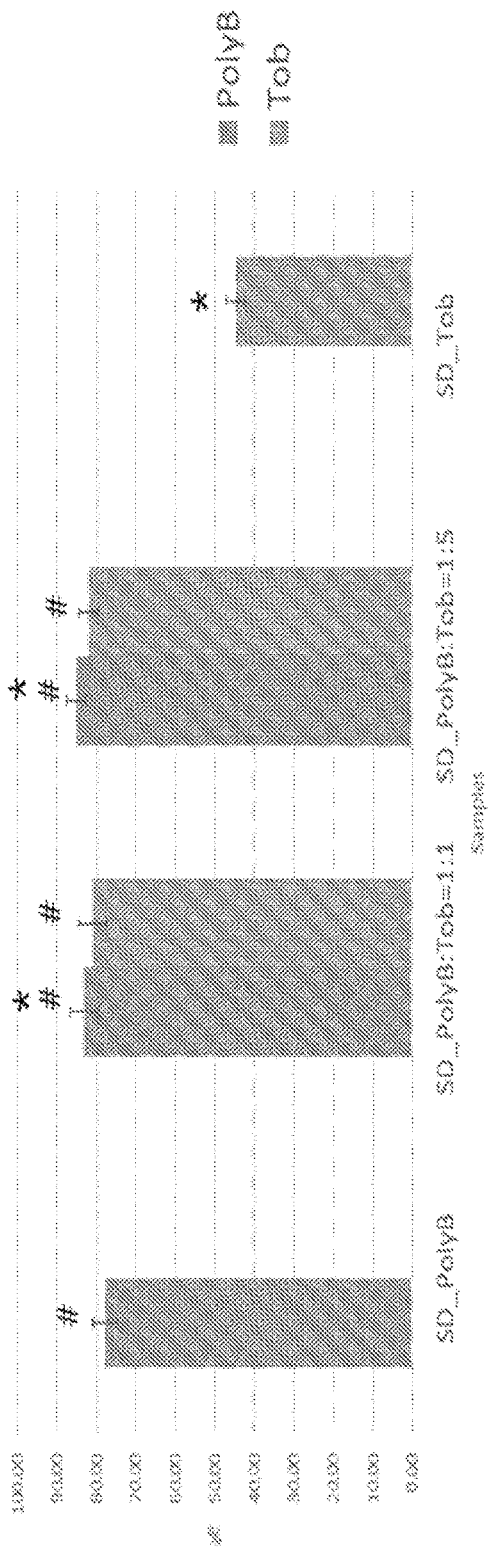
Figure 6B:
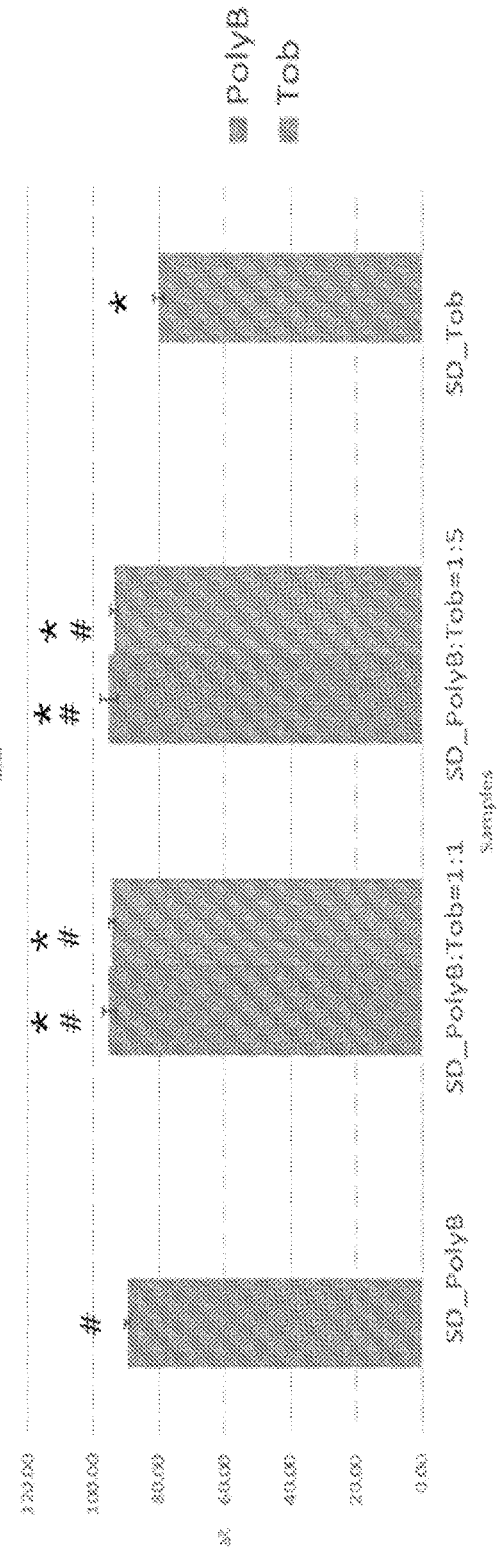
Figure 6C:
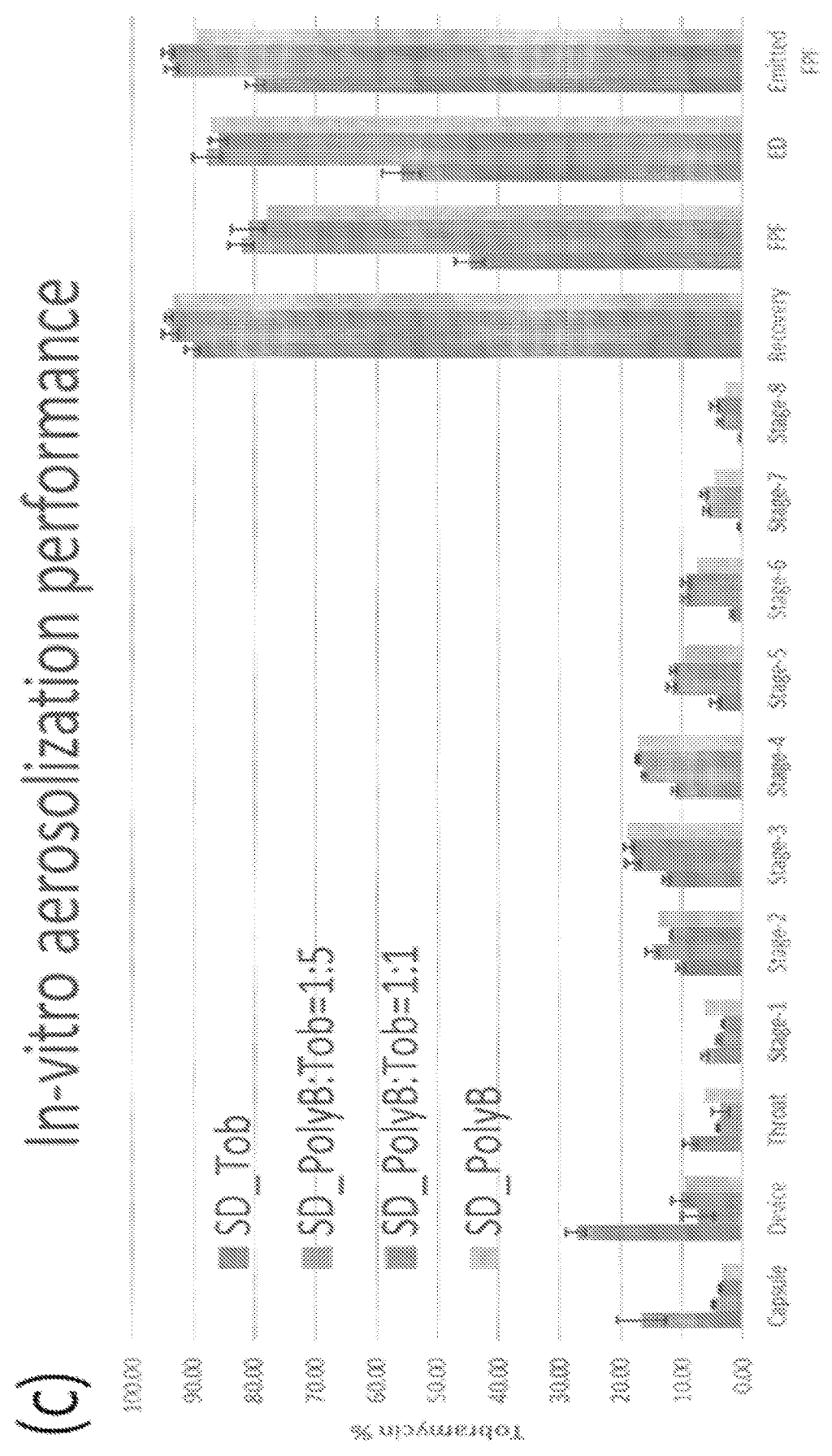
Figure 7A:
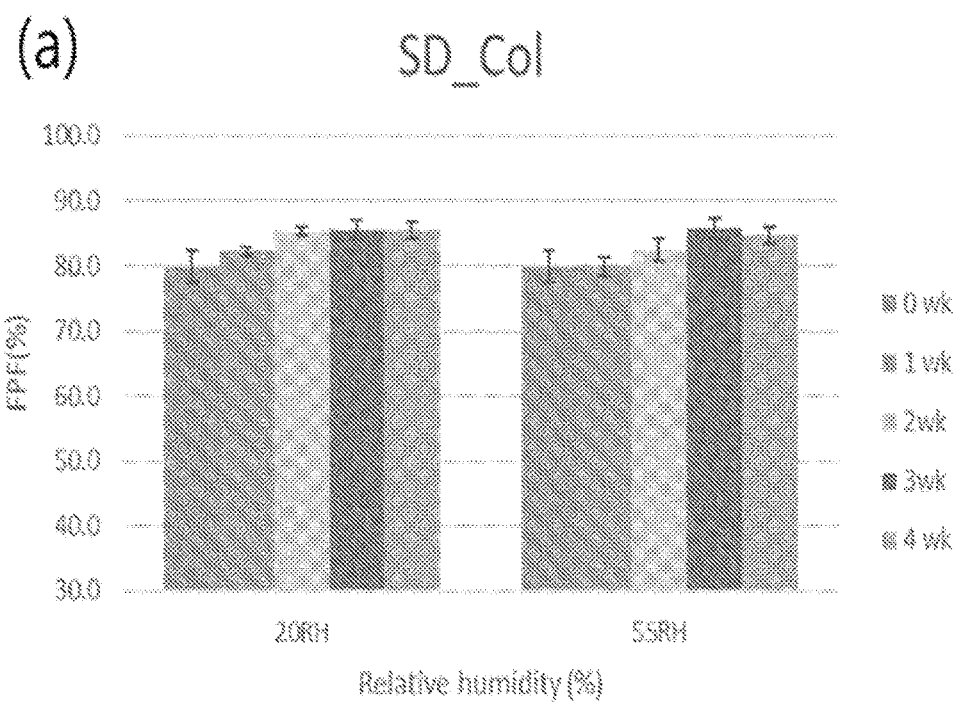
FIGS. 7A-7D: Changes in FPF of colistin and tobramycin in the spray dried formulations which were stored at 20% RH and 55% RH (mean±SD, n=3): SD_Col (FIG. 7A), SD_Tob (FIG. 7B), SD_Col1Tob1 (FIG. 7C), and SD_Col1Tob5 (FIG. 7D).
Figure 7B:
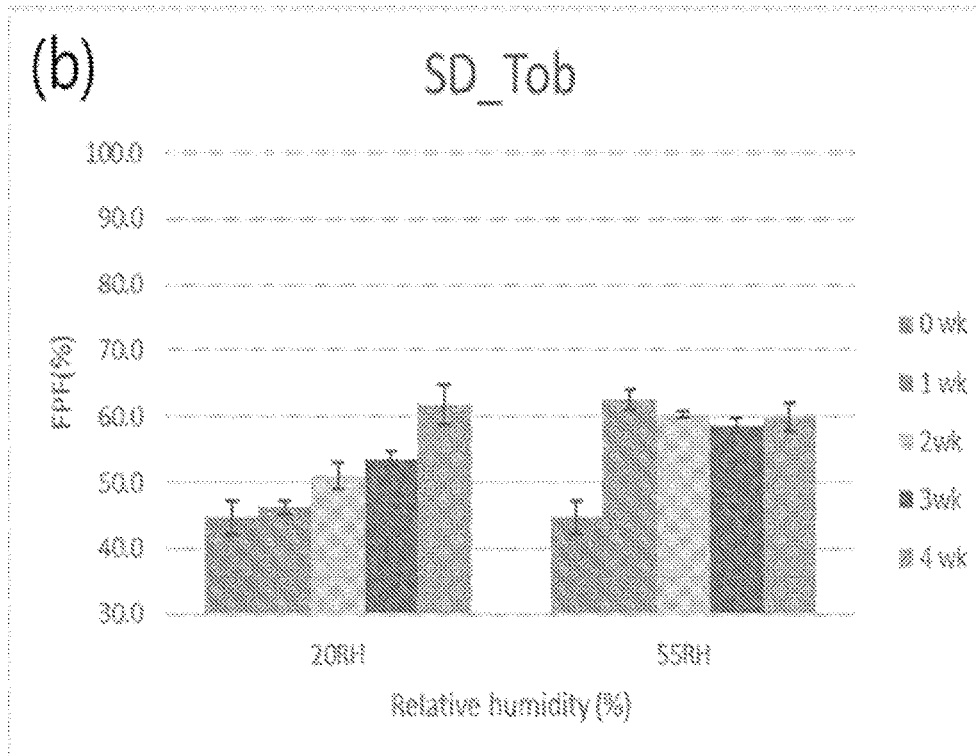
Figure 7C:
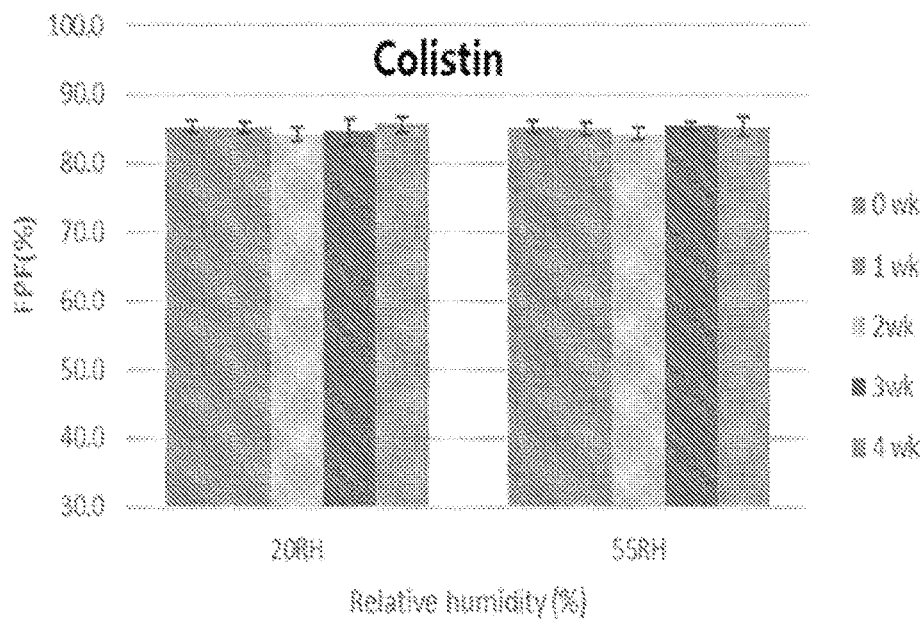
Figure 7C:
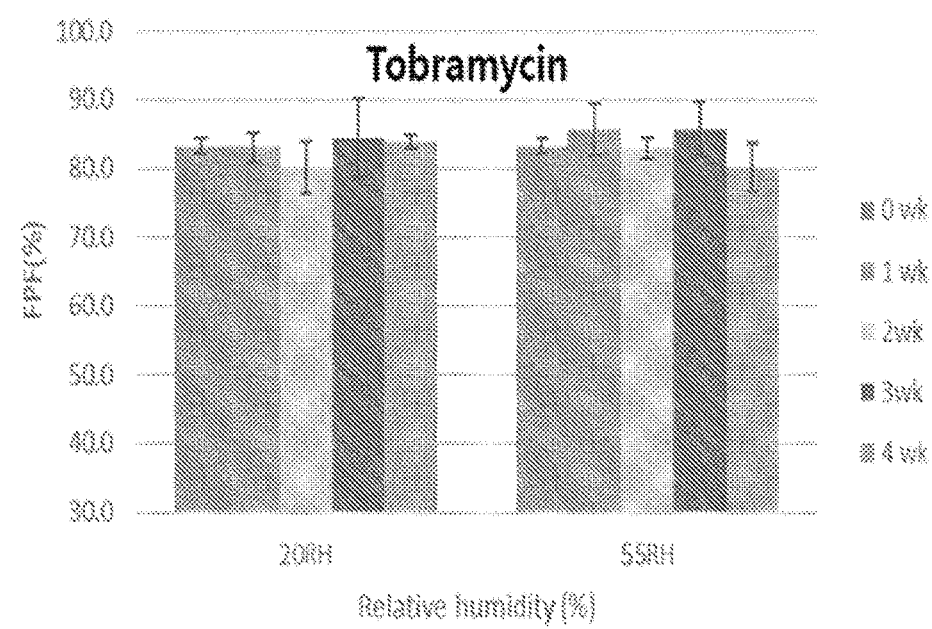
Figure 7D:
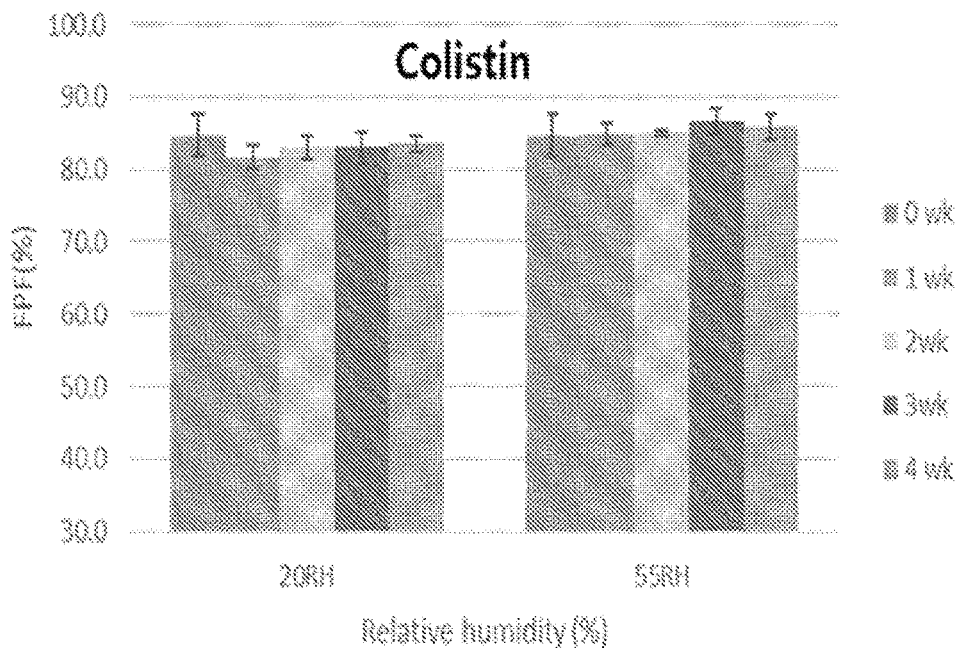
Figure 7D:
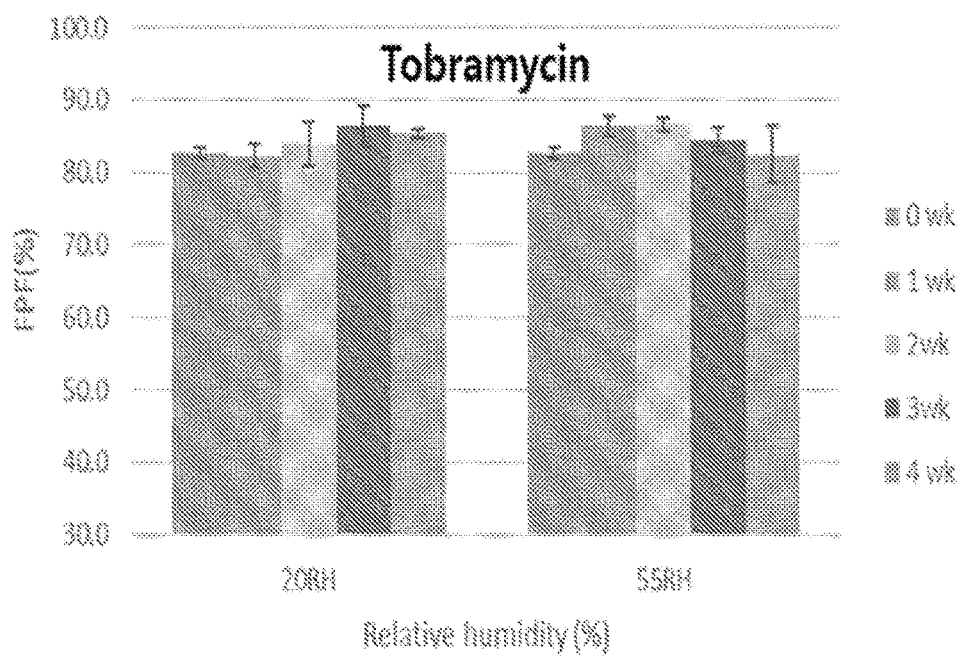

FIGS. 5 and 6 show the FPF, E-FPF and NGI deposition profiles of the spray-dried formulations. Our results showed that the FPF values of SD_Col and SD_PolyB have no significant difference, but both are substantially higher than that of SD-Tob. The improved FPF of combination formulation with tobramycin with colistin or polymyxin B showed enhanced aerosolization performance when compared with SD_Tob suggesting that colistin and polymyxin B improved the aerosolization of tobramycin.

TABLE 1

Content of tobramycin and colistin or polymyxin B in the formulations (mean ± SD, n = 10) and their acceptance values (AV)

| Formulation | API | Content (%) Average | S.D. | Acceptance value (AV) |
|---|---|---|---|---|
| SD_Col1Tob1 | Col | 99.6 | 2.6 | 6.1 |
|  | Tob | 101.2 | 1.9 | 4.6 |
| SD_Col1Tob5 | Col | 98.7 | 2.0 | 4.9 |
|  | Tob | 99.7 | 2.4 | 5.9 |
| SD_PolyB1Tob1 | PolyB | 98.2 | 1.3 | 3.1 |
|  | Tob | 98.3 | 2.9 | 6.1 |
| SD_PolyB1Tob5 | PolyB | 102.5 | 1.5 | 3.6 |
|  | Tob | 98.0 | 1.9 | 4.5 |

TABLE 2

Particle size of the spray dried powder formulations

| Sample |  | $D_{10}$ (μm) | $D_{50}$ (μm) | $D_{90}$ (μm) | Span |
|---|---|---|---|---|---|
| SD_Col | Average | 1.2 | 2.4 | 5.2 | 1.7 |
|  | S.D. | 0.0 | 0.0 | 0.3 | 0.1 |
| SD_PolyB | Average | 1.2 | 2.5 | 5.3 | 1.7 |
|  | S.D. | 0.0 | 0.0 | 0.2 | 0.0 |
| SD_Tob | Average | 1.0 | 2.3 | 5.4 | 2.0 |
|  | S.D. | 0.0 | 0.1 | 0.4 | 0.1 |
| SD_Col1Tob1 | Average | 1.1 | 2.3 | 5.0 | 1.7 |
|  | S.D. | 0.0 | 0.0 | 0.1 | 0.0 |
| SD_Col1Tob5 | Average | 1.1 | 2.3 | 5.4 | 1.9 |
|  | S.D. | 0.0 | 0.0 | 0.1 | 0.0 |
| SD_PolyB1Tob1 | Average | 1.1 | 2.2 | 4.5 | 1.5 |
|  | S.D. | 0.0 | 0.0 | 0.1 | 0.0 |
| SD_PolyB1Tob5 | Average | 1.1 | 2.5 | 5.8 | 1.9 |
|  | S.D. | 0.0 | 0.0 | 0.1 | 0.0 |

Physical Stability

Considering the similar chemical structure and physicochemical properties of colistin and polymyxin B, and based on the results that the aerosolization performance of spray dried colistin and polymyxin B is almost equivalent, physical stability test was performed only for co-spray dried tobramycin with colistin and compared to the physical stability of SD_Tob and SD_Col.

Stability of In Vitro Aerosolization Performance

The FPF of SD_Col did not significantly change at both 20 and 55% RH over the storage period (FIG. 7). In contrast, the FPF of SD_Tob increased gradually with storage time at 20% RH. At 50% RH, the FPF rapidly increased at 1 week, but after that no remarkable change was observed. As shown in FIG. 8, these increases in FPF for SD_Tob are due to the increase in ED (FIG. 8).

Interestingly, the co-spray dried tobramycin with colistin at molar ratios of 1:1 and 1:5 showed stable aerosolization performance during storage at both 20 and 55% RH for 4 weeks. These results indicate that colistin improves the stability of aerosolization performance for tobramycin.

As shown in FIG. 4, PXRD patterns depict that the SD_Col, SD_Tob and co-spray dried combination formulation of colistin and tobramycin with different mole ratios were amorphous and did not show remarkable crystallization up to 4 weeks when stored at 20 and 55% RH.

CONCLUSIONS

Both aminoglycosides (e.g. tobramycin) and polymyxins (e.g. polymyxin B) are nephrotoxic at high doses. Unexpectedly, we have discovered that aminoglycosides (e.g.

tobramycin) inhibit the polymyxin-induced toxicity in human lung epithelial cells in a dose-dependent manner. Co-administration of tobramycin attenuates lung toxicity induced by polymyxins in mice. Dry powder formulations had the uniform content and inhalable particle size distributions in the amorphous form. Addition of polymyxins in the combination formulations significantly improved the aerosolization of tobramycin. Furthermore, it was also shown that polymyxins significantly improved the stability of aerosolization performance for tobramycin.

Experimental Methods

Materials

Colistin sulfate, polymyxin B sulfate and tobramycin sulfate were purchased from BetaPharma Co. Ltd (Wujiang City, JiangSu Province, China).

Toxicity

Human lung epithelial cells (A549 cells) were obtained from American Type Culture Collection (ATCC® CCL-185™, Manassas, VA, USA), grown and sub-cultured in Dulbecco's modified Eagle's medium (DMEM) supplemented with 10% fetal bovine serum (FBS). A549 cells ($1 \times 10^5$ cells/mL, 12-well plate) were seeded in supplemented DMEM at 37° C. in a humidified atmosphere containing 5% $CO_2$ until 80% confluency. All experiments were conducted in three replicates. Cells were treated with 1.0 mM polymyxin B in the presence and absence of tobramycin (1.0, 3.0, 5.0, 10.0 and 20.0 mM), amikacin (5.0 and 20.0 mM), gentamicin (5.0, 10.0 and 20.0 mM) and plazomicin (5.0 and 20.0 mM) in supplemented DMEM (1% FBS); and cell viability were examined at 24$h$ with flow cytometry after staining with propidium iodide. The drug concentrations were selected based on our previous observation of polymyxin-induced toxicity in lung epithelial cells.

The animal study was approved by the Animal Ethics Committee of the Monash Institute of Pharmaceutical Sciences, Monash University (Parkville, Victoria, Australia). All experiments were conducted in accordance with the Australian Code of Practice for the Care and Use of Animals for Scientific Purposes. Swiss Albino mice (female; age, 6 weeks; body weight, 20 to 25 g) were obtained from the Monash Animal Research Platform (Clayton, Victoria, Australia). The temperature and humidity of the facility, which had a 12-$h$ light and 12-$h$ dark cycle, were controlled. The animals were housed individually in metabolic cages and had free access to food and water. Mice were intratracheally administered 10 mg/kg of polymyxin B, 60 mg/kg of tobramycin and the combination of tobramycin with polymyxin B in sterile 0.9% saline three times a day and lung histology examination were conducted in a blind manner.

Spray Drying

Spray-dried formulations, as presented in Table 3, were prepared by spray drying an aqueous solution (21.7 mg/mL of total solutes) of single pure component or combination formulations of tobramycin and colistin or polymyxin B using a BUCHI B-290 mini spray dryer with a standard two-fluid nozzle (BUCHI Labortechnik AG, Flawil, Switzerland). The aqueous drug solution containing combination formulations were prepared by mixing of each pure component solution at a volume ratio of 1 to 1 as shown in Table 3. Spray drying was conducted at a feed rate of 2 mL/min with an inlet air temperature (Tin) of 120±5° C., aspirator at 35 m$^3$/h, and an atomizing air of 700 L/h. These conditions resulted in an outlet temperature ($T_{out}$) of approximately 68±3° C. The spray-dried powders were divided into 2 equal parts and stored in (1) a desiccator containing silica gel to maintain 20±2% RH at 20±2° C. or (2) a humidity chamber containing saturated magnesium nitrate solution to maintain 55±2% RH at 20±2° C. At 1, 2, 3 and 4 weeks, samples were collected for physiochemical characterization.

TABLE 3

Compositions of the spray-dried formulations

| Sample | | Molar ratio | Weight ratio | Weight (mg)/Lot | Water vol. (mL) | Conc. (mg/mL) |
|---|---|---|---|---|---|---|
| SD_Col1Tob1 | Col | 1.00 | 1.00 | 750.0 | 25.0 | 30.0 |
| | Tob | 1.00 | 0.45 | 334.7 | 25.0 | 13.4 |
| | Final_Total | | | 1084.7 | 50.0 | 21.7 |
| SD_Col1Tob5 | Col | 1.00 | 1.00 | 336.0 | 25.0 | 13.4 |
| | Tob | 5.00 | 2.23 | 749.6 | 25.0 | 30.0 |
| | Final_Total | | | 1085.6 | 50.0 | 21.7 |
| SD_PolyB1Tob1 | Poly B | 1.00 | 1.00 | 756.0 | 25.0 | 30.2 |
| | Tob | 1.00 | 0.43 | 328.5 | 25.0 | 13.1 |
| | Final_Total | | | 1084.5 | 50.0 | 21.7 |
| SD_PolyB1Tob5 | Poly B | 1.00 | 1.00 | 342.0 | 25.0 | 13.7 |
| | Tob | 5.00 | 2.17 | 743.1 | 25.0 | 29.7 |
| | Final_Total | | | 1085.1 | 50.0 | 21.7 |
| SD_PolyB | Poly B | | | 1085.0 | 50.0 | 21.7 |
| SD_Tob | Tob | | | 1085.0 | 50.0 | 21.7 |
| SD_Col | Col | | | 1085.0 | 50.0 | 21.7 |

Particle Size Distribution (PSD)

The PSD of sample was determined by the laser diffraction method using a Mastersizer 3000 with Aero-S for dry powder dispersion (Malvern Instruments, Worcestershire, UK). Powder sample was fed into the dispersion system for analysis. The feed rate was 50-60% to keep the laser obscuration level at 2-6%. Compressed air at 4 bar was used to disperse the powder particles through the optical cell. A measurement time of 5 s was used, and background measurements were made using air for 10 s. The volume diameters of $D_{10}$, $D_{50}$, and $D_{90}$ were used to characterize the particle size of powders. The size distribution was determined using the Span value, which is calculated as the ratio of ($D_{90}$-$D_{10}$) to $D_{50}$. Smaller span values represent narrower particle size distributions.

Scanning Electron Microscopy (SEM)

The particle morphology of samples was examined by SEM (NOVA nanoSEM, FEI Company, Hillsboro, Oregon, USA). The powder sample was dispersed on a sample stub mounted with the adhesive carbon tape. The excess powder was removed with the pressurized air and then coated with a thin platinum film at 40 mA for 1 min using a sputter coater (208 HR, Cressington Sputter Coater, England, UK). The coated samples were analyzed at an acceleration voltage of 5 kV.

Powder X-Ray Diffraction (PXRD)

A Rigaku Smartlab™ diffractometer (Rigaku Americas, The Woodlands, TX) with a Cu-Ka radiation source was used to evaluate powder crystallinity. The diffraction patterns were determined from 5° to 40° 2θ at a scan speed of 5°/min at 40 kV.

Drug Quantification

Contents of tobramycin, colistin and polymyxin B were measured by established high-performance liquid chromatography (HPLC) methods. Briefly, an Agilent 1260 HPLC system (Agilent, Waldbronn, Germany) and an Eclipse Plus column (5 mm C18 150×4.60 mm, Agilant, Waldbronn, Germany) were used to detect colistin and polymyxin B at 214 nm. The mobile phase consisted of 76% (w/w) 30 mM sodium sulfate solution (adjusted to pH 2.5 with $H_3PO_4$), and 24% (v/v) acetonitrile was running at 1.0 mL/min. The injection volume was 30 μL. Concentration for tobramycin was determined by high-performance liquid chromatography (HPLC)-UV using the borate ion complexation with tetrahydroxyborate (THB) included in mobile phase like as follow:

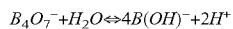

$$B_4O_7^- + H_2O \leftrightarrow 4B(OH)^- + 2H^+$$

The 0.1 M disodium tetraborate buffer was adjusted to pH 9.0 using 0.1M phosphoric acid. The mobile phase consisted of methanol: disodium tetraborate decahydrate buffer (0.1 M; pH=9.0):water (20:20:60) containing 1 g/L sodium octanesulfonate, resulting in an isocratic elution of the sample at a flow rate of 1.0 mL/min. Analysis was done using an Eclipse Plus column (5 mm C18 150×4.60 mm, Agilent, Waldbronn, Germany). Column temperature was adjusted to 65° C. and maintained constant using a water bath equipped with an G1330B (1290 Thermostate, Agilant, Waldbronn, Germany) thermostate. Tobramycin peak was detected at 195 nm with an injection volume of 80 μL.

Content Uniformity

The content uniformity of tobramycin and colistin or polymyxin B in the resultant combination formulations were determined. Briefly, 10 samples of 10±0.5 mg for each formulation were weighed and dissolved in 25 mL of Milli-Q water, which was then diluted to an appropriate concentration for quantification of each drug. The drug quantification methods are provided above. Drug content (%) was calculated by dividing the theoretical concentration by the measured concentration and then multiplying by 100. From the USP-NF General Chapter <905> Uniformity of Dosage Units—Solid dosage forms, acceptance value was calculated by the following equation:

$$AV(\text{Acceptance value}) = |M-X| + ks,$$

wherein M is the reference value, X is the mean of individual contents %, k is the acceptability (if n=10, then k=2.4), and s is the standard deviation. The target content is 100.0% in this study, and the values of M are like follows: If 98.5%≤X≤101.5%, then M=X, if X≤98.5%, then M=98.5%, and if X≥101.5%, then M=101.5%. If the AV is less than the L1%=15%, the content uniformity was acceptable based on standard criterion of USP In Vitro Aerosolization Performance A next-generation impactor was used to determine in vitro aerosolization performance (NGI, Copley, Nottingham, UK). Each powder sample (10±1 mg) was filled into the Size 3 HPMC capsules (Qualicaps, Whitsett, NC). The capsules were loaded in a low-resistant RS01 DPI device (Plastiape S.p.A., Osnago, Italy). Briefly, 4 L of air was drawn through the inhaler by a vacuum pump to generate an airflow rates of 100 L/min for 2.4 s, which are corresponding to pressure drop values of ~4 kPa across the RS01 DPI device. The emitted dose (ED) was determined as the percentage of drug dispersed from the capsule and device, which is the sum of drug deposit percentage from throat to stage MOC (microorifice collector) compared to total recovered drug. Fine particle fraction (FPF) was calculated as the fraction of drug with an aerodynamic diameter <5 mm over the total recovered drug. Triplicates were conducted for each formulation. The emitted FPF (E-FPF) was defined as particles with an aerodynamic size below 5 μm relative to the ED.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected. It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

REFERENCES CITED

1. Velkov T, Rahim N A, Zhou Q T, Chan H-K, Li J. 2015. Inhaled anti-infective chemotherapy for respiratory tract infections: Successes, challenges and the road ahead. Advanced Drug Delivery Reviews 85:65-82.
2. Ahmed M U, Velkov T, Lin Y-W, Yun B, Nowell C J, Zhou F, Zhou Q T, Chan K, Azad M A, Li J. 2017. Potential toxicity of polymyxins in human lung epithelial cells. Antimicrobial Agents and Chemotherapy 61:e02690-16.
3. Ahmed M U, Velkov T, Zhou Q T, Fulcher A J, Callaghan J, Zhou F, Chan K, Azad M A, Li J. 2019. Intracellular localization of polymyxins in human alveolar epithelial cells. Journal of Antimicrobial Chemotherapy 74:48-57.
4. Cheer S M, Waugh J, Noble S. 2003. Inhaled tobramycin (TOBI): a review of its use in the management of *Pseudomonas aeruginosa* infections in patients with cystic fibrosis. Drugs 63:2501-20.
5. Bulitta J B, Ly N S, Landersdorfer C B, Wanigaratne N A, Velkov T, Yadav R, Oliver A, Martin L, Shin B S, Forrest A, Tsuji B T. 2015. Two mechanisms of killing of *Pseudomonas aeruginosa* by tobramycin assessed at multiple inocula via mechanism-based modeling. Antimicrobial Agents and Chemotherapy 59:2315.

6. Riethmuller J, Herrmann G, Graepler-Mainka U, Hellwig D, Heuer H E, Heyder S, Koster H, Kinder B, Kroger K, Paul K, Poplawska K, Melichar V O, Smaczny C, Mellies U. 2016. Sequential inhalational tobramycin-colistin-combination in CF-patients with chronic *P. aeruginosa* colonization—an observational study. Cell Physiol Biochem 39:1141-51.

7. Tappenden P, Harnan S, Uttley L, Mildred M, Carroll C, Cantrell A. 2013. Colistimethate sodium powder and tobramycin powder for inhalation for the treatment of chronic *Pseudononas aeruginosa* lung infection in cystic fibrosis: systematic review and economic model. Health Technol Assess 17:v-xvii, 1-181.

8. Nagai J, Tanaka H, Nakanishi N, Murakami T, Takano M. 2001. Role of megalin in renal handling of aminoglycosides. Am J Physiol Renal Physiol 281:F337-44.

9. Suzuki T, Yamaguchi H, Ogura J, Kobayashi M, Yamada T, Iseki K. 2013. Megalin contributes to kidney accumulation and nephrotoxicity of colistin. Antimicrob Agents Chemother 57:6319-24.

10. Sheikh Z, Bradbury P, Reekie T A, Pozzoli M, Robinson P D, Kassiou M, Young P M, Ong H X, Traini D. 2021. Tobramycin and colistin display anti-inflammatory properties in CuFi-1 cystic fibrosis cell line. Eur J Pharmacol doi:10.1016/j.ejphar.2021.174098:174098.

11. Abraham D J, Rotella D P, Burger A. 2010. Burger's medicinal chemistry, drug discovery and development, 7th ed. Wiley, Hoboken, N.J.

12. Roberts K D, Azad M A K, Wang J P, Horne A S, Thompson P E, Nation R L, Velkov T, Li J. 2015. Antimicrobial activity and toxicity of the major lipopeptide components of polymyxin B and colistin: last-line antibiotics against multidrug-resistant Gram-negative bacteria. ACS Infectious Diseases 1:568-575.

We claim:

1. A method of reducing the toxicity of an inhaled polymyxin as a therapeutic agent comprising co-administering an aminoglycoside with said polymyxin, wherein said aminoglycoside attenuates lung tissue damage caused by said polymyxin.

2. The method of claim 1, wherein said therapeutic agent is for the treatment of a lung infection.

3. The method of claim 1, wherein the molar ratio of said polymyxin to said aminoglycoside is about 20:1 to about 1:20.

4. The method of claim 1, wherein said polymyxin comprises polymyxin B, colistin, or any polymyxin-like peptides.

5. The method of claim 1, wherein said aminoglycoside comprises at least tobramycin, amikacin, gentamicin, plazomicin, or a combination thereof.

6. A method for improving the aerosolization of an aminoglycoside comprising co-formulating the aminoglycoside with a polymyxin.

7. The method of claim 6, wherein the molar ratio of said polymyxin to said aminoglycoside is about 20:1 to about 1:20.

8. A process for manufacturing a solution or a suspension for nebulization of a polymyxin and an aminoglycoside comprising dissolving or suspending drug material of said polymyxin and said aminoglycoside in an aqueous or organic medium to afford said solution or suspension.

9. The process of claim 8, wherein the molar ratio of said polymyxin to said aminoglycoside is about 20:1 to about 1:20.

10. The process of claim 8, wherein said solution or suspension comprises approximately 0.5 to about 200 mg of said polymyxin and aminoglycoside per milliliter at a molar ratio of about 20:1 to about 1:20.

11. A process for manufacturing a dry powder composition of a polymyxin and an aminoglycoside comprising the steps of:

a. dissolving or suspending drug materials of said polymyxin and aminoglycoside in an aqueous or organic medium to prepare a drug solution or suspension; and
b. spray-drying, spray freeze-drying, or freeze drying said solution or suspension to afford said dry powder.

12. The process of claim 11, wherein the molar ratio of said polymyxin to aminoglycoside is about 20:1 to about 1:20.

13. The process of claim 11, wherein said solution or suspension comprises approximately 0.5 to 200 mg of said polymyxin and aminoglycoside per milliliter at a molar ratio of about 20:1 to about 1:20.

14. A dry powder composition manufactured according to the process of claim 11.

15. The dry powder composition of claim 14, wherein said polymyxin and aminoglycoside are at a molar ratio of about 20:1 to about 1:20.

16. A pharmaceutical composition comprising a solution or a suspension manufactured according to the process of claim 8 together with one or more pharmaceutically acceptable excipients.

17. The pharmaceutical composition of claim 16, wherein said polymyxin and aminoglycoside are at a molar ratio of about 20:1 to about 1:20.

* * * * *